(12) United States Patent
Drzal et al.

(10) Patent No.: US 9,776,874 B1
(45) Date of Patent: Oct. 3, 2017

(54) PI COUPLING AGENTS FOR DISPERSION OF GRAPHENE NANOPLATELETS IN POLYMERS

(76) Inventors: Lawrence T. Drzal, Okemos, MI (US); Xian Jiang, Lansing, MI (US)

( * ) Notice: Subject to any disclaimer, the term of this patent is extended or adjusted under 35 U.S.C. 154(b) by 1321 days.

(21) Appl. No.: 13/199,086

(22) Filed: Aug. 18, 2011

Related U.S. Application Data

(60) Provisional application No. 61/402,138, filed on Aug. 24, 2010, provisional application No. 61/464,397, filed on Mar. 3, 2011.

(51) Int. Cl.
*C08K 3/04* (2006.01)
*C01B 31/04* (2006.01)
*C09C 1/46* (2006.01)

(52) U.S. Cl.
CPC ...... *C01B 31/0423* (2013.01); *C01P 2004/24* (2013.01)

(58) Field of Classification Search
CPC .... C08K 3/00; C08K 3/04; C09C 1/46; C01B 31/0423; C01P 2004/24
USPC ................ 524/495; 106/31.13, 472; 423/448
See application file for complete search history.

(56) References Cited

U.S. PATENT DOCUMENTS

| | | |
|---|---|---|
| 2004/0127621 A1 | 7/2004 | Drzal et al. |
| 2006/0231792 A1 | 10/2006 | Drzal et al. |
| 2006/0241237 A1 | 10/2006 | Drzal et al. |
| 2008/0206124 A1 | 8/2008 | Jang et al. |
| 2010/0147188 A1* | 6/2010 | Mamak et al. ............ 106/31.13 |

* cited by examiner

*Primary Examiner* — Bijan Ahvazi
*Assistant Examiner* — Ronald Grinsted

(57) ABSTRACT

The disclosure relates to use of a coupling agent including of a chemical moiety that is capable of pi bonding with the basal plane of exfoliated graphene nanoparticle (EGN) platelets and that is compatible with a polymer resin or matrix into which the EGN platelets are dispersed. The chemical moiety can include one or more aromatic moieties grafted to a polymer, which polymer can form a dispersing resin or matrix.

38 Claims, 4 Drawing Sheets

000# PI COUPLING AGENTS FOR DISPERSION OF GRAPHENE NANOPLATELETS IN POLYMERS

BACKGROUND OF THE DISCLOSURE

Field of the Disclosure

The disclosure relates to use of a coupling agent including of a chemical moiety that is capable of pi bonding with the basal plane of exfoliated graphene nanoparticle (EGN) platelets and that is compatible with a polymer resin or matrix into which the EGN platelets are dispersed. The chemical moiety can include one or more aromatic moieties grafted to a polymer, which polymer can form a dispersing resin or matrix.

SUMMARY

The disclosure generally relates to a composition comprising: (a) a polymer-graphene compatibilizer comprising: (i) a first polymer (e.g., a thermoplastic polymer; a thermoset polymer) and (ii) one or more aromatic moieties grafted to the first polymer; (b) exfoliated graphene nanoparticle (EGN) platelets (e.g., having a thickness ranging from 0.3 nm to 20 nm and/or a width ranging from 0.1 µm to 20 µm) dispersed in the polymer-graphene compatibilizer; and (c) optionally a second polymer (e.g., a thermoplastic polymer; a thermoset polymer; the same as or different from the first polymer of the polymer-graphene compatibilizer) as a matrix polymer for a composite material comprising the polymer-graphene compatibilizer, the EGN platelets, and the second polymer; wherein the polymer-graphene compatibilizer and the EGN platelets are coupled via pi-pi interactions (e.g., free of covalent bonds) between the aromatic moieties of the compatibilizer and basal planes of the EGN platelets.

In an embodiment, a method for forming a composite material is disclosed, the method comprising: (a) providing a composition comprising a polymer-graphene compatibilizer and EGN platelets dispersed in the polymer-graphene compatibilizer; (b) providing a second polymer as a matrix polymer; (c) melt blending (e.g., extruding, optionally including injection molding) the composition and the second polymer, thereby forming a composite material comprising the polymer-graphene compatibilizer, the EGN platelets, and the second polymer; wherein: (i) the second polymer can be the same as or different from the first polymer of the polymer-graphene compatibilizer; and (ii) the polymer-graphene compatibilizer and the EGN platelets are coupled via pi-pi interactions between the aromatic moieties of the compatibilizer and basal planes of the EGN platelets.

In an embodiment of the disclosure, a polymer-graphene compatibilizer comprises: (a) a first polymer; and (b) one or more aromatic moieties grafted to the first polymer; wherein: (i) the aromatic moieties are grafted to the first polymer via a reaction product of (A) a pendant anhydride group on the first polymer, (B) a diaminoalkane forming a linking group between the aromatic moiety and the first polymer, and (C) an aldehyde-functional aromatic hydrocarbon forming the aromatic moiety; and (ii) the polymer-graphene compatibilizer is capable of coupling with exfoliated graphite nanoparticle (EGN) platelets via pi-pi interactions between the aromatic moieties of the compatibilizer and basal planes of the EGN platelets.

In a related embodiment of the disclosure, a method for forming a polymer-graphene compatibilizer, the method comprises: (a) reacting (i) an aldehyde-functional aromatic hydrocarbon, (ii) a polyaminoalkane, and (iii) a first polymer comprising one or more pendant anhydride groups, thereby forming the polymer-graphene compatibilizer with one or more aromatic moieties grafted to the first polymer: wherein: (i) the aromatic moiety is derived from the aldehyde-functional aromatic hydrocarbon; and (ii) the polyaminoalkane forms (A) an imine linkage to the aromatic moiety and (B) an amide linkage to the first polymer. The reacting part (a) can comprise: (i) providing the aldehyde-functional aromatic hydrocarbon; (ii) reacting the aldehyde-functional aromatic hydrocarbon with the polyaminoalkane, thereby forming an amino-functionalized aromatic hydrocarbon with the imine linkage; and (iii) reacting the amino-functionalized aromatic hydrocarbon with the first polymer, thereby forming the polymer-graphene compatibilizer with the amide linkage to the first polymer of the amino-functionalized aromatic hydrocarbon. For example, (i) the first polymer can comprise a polyethylene-graft-maleic anhydride polymer with pendant anhydride groups grafted to the polyethylene backbone; (ii) the linking group can comprise diaminododecane; and/or (iii) the aldehyde-functional aromatic hydrocarbon can comprise 1-pyrenecarbaldehyde.

In another embodiment, a method for forming a dispersion of exfoliated graphite nanoparticle (EGN) platelets in a polymer-graphene compatibilizer is disclosed, the method comprising: (a) providing a composition comprising (i) a polymer-graphene compatibilizer comprising (A) a first polymer and (B) one or more aromatic moieties grafted to the first polymer, (ii) a solvent for the polymer-graphene compatibilizer, and (iii) exfoliated graphite nanoparticle (EGN) platelets; (b) mixing the composition, thereby providing the polymer-graphene compatibilizer in solution with the solvent and dispersing the EGN platelets in the solvent; and (c) removing the solvent from the composition, thereby forming a dispersion of the EGN platelets in the polymer-graphene compatibilizer in which the polymer-graphene compatibilizer and the EGN platelets are coupled via pi-pi interactions between the aromatic moieties of the compatibilizer and basal planes of the EGN platelets.

In another embodiment, a method for forming a dispersion of exfoliated graphite nanoparticle (EGN) platelets in a polymer-graphene compatibilizer is disclosed, the method comprising: (a) providing a composition comprising (i) a polymer-graphene compatibilizer precursor comprising (A) a first thermoset polymer precursor and (B) one or more aromatic moieties grafted to the first thermoset polymer precursor, (ii) a solvent for the polymer-graphene compatibilizer precursor, and (iii) exfoliated graphite nanoparticle (EGN) platelets; (b) mixing the composition, thereby providing the polymer-graphene compatibilizer precursor in solution with the solvent and dispersing the EGN platelets in the solvent; (c) removing the solvent from the composition, thereby forming a dispersion of the EGN platelets in the polymer-graphene compatibilizer precursor in which the polymer-graphene compatibilizer precursor and the EGN platelets are coupled via pi-pi interactions between the aromatic moieties of the compatibilizer precursor and basal planes of the EGN platelets; (d) adding a second thermoset polymer precursor to the dispersion of the EGN platelets in the polymer-graphene compatibilizer precursor, wherein the second thermoset polymer precursor is a complementary thermoset precursor reactive with polymer-graphene compatibilizer precursor; and (e) curing the second thermoset polymer and the polymer-graphene compatibilizer precursor with the EGN platelets dispersed therein, thereby forming dispersion of the EGN platelets in a thermoset polymer-graphene compatibilizer, wherein the thermoset polymer-graphene compatibilizer and the EGN platelets are coupled via pi-pi interactions between the aromatic moieties of the compatibilizer and basal planes of the EGN platelets.

In the dispersion-forming methods, the solvent can comprise a hydrophobic organic solvent such as an aromatic solvent. The mixing step can comprise: (i) heating the composition to dissolve the polymer-graphene compatibilizer (precursor) in the solvent; and (ii) performing ultrasonic mixing to disrupt aggregates of EGN platelets and increase pi-pi interactions between the aromatic moieties of the compatibilizer (precursor) and basal planes of the EGN platelets. The removing step can comprise: (i) evaporating the solvent; and (ii) heating the dispersion of the EGN platelets in the polymer-graphene compatibilizer (precursor) to remove residual solvent or water.

Various modifications and extensions of the foregoing compositions and methods are possible. For example, the aromatic moieties can be directly grafted to the first polymer and/or the aromatic moieties can be grafted to the first polymer via a linking group containing 1 to 40 non-hydrogen atoms between the first polymer and the aromatic moieties. In a refinement, the aromatic moieties are grafted to the first polymer via a reaction product of (i) a pendant anhydride group on the first polymer (e.g., polyethylene-graft-maleic anhydride polymer with pendant anhydride groups grafted to the polyethylene backbone), (ii) a diaminoalkane (e.g., diaminododecane) forming the linking group, and (iii) an aldehyde-functional aromatic hydrocarbon (1-pyrenecarbaldehyde) forming the aromatic moiety. The aromatic moieties can have between 1 and 20 aromatic rings, for example between 2 and 10 fused aromatic rings. The aromatic moieties can be derived from one or more polynuclear aromatic hydrocarbons, for example one or more of acenaphthene, acenaphthylene, anthanthrene, anthracene, azulene, benzene, benzo(a)anthracene, benzo(a)fluorene, benzo(c)phenanthrene, benzopyrene, benzo(a)pyrene, benzo(e)pyrene, benzo(b)fluoranthene, benzo(j)fluoranthene, benzo(k)fluoranthene, benzo(ghi)perylene, corannulene, coronene, chrysene, dibenzo(ah)anthracene, dicoronylene, diindenoperylene, fluoranthene, fluorene, helicene, heptacene, hexacene, indeno(1,2,3-cd)pyrene, kekulene, 1-methylnaphthalene, 2-methylnaphthalene, naphthalene, ovalene, pentacene, perylene, phenalene, phenanthrene, picene, pyrene, tetracene, tetraphenylene, and triphenylene, alkyl-substituted derivatives thereof, and combinations thereof. The aromatic moieties can be incorporated into the polymer-graphene compatibilizer at a level ranging from 0.001 mol. % to 1 mol. % based on the number of aromatic moieties relative to the number of repeating units in the polymer-graphene compatibilizer. Further, a ratio of the surface area of the aromatic moieties present in the polymer-graphene compatibilizer in the composition relative to the surface area of the EGN platelets present in the composition can range from 0.01 to 0.2 or from 0.02 to 0.1, for example when the composition is dispersion of the EGN platelets in polymer-graphene compatibilizer with or without the second polymer as a matrix polymer. Similarly, a ratio of the surface area of a monolayer equivalent of the polymer-graphene compatibilizer in the composition relative to the surface area of the EGN platelets present in the composition ranges from 0.1 to 20 or from 1 to 4.

The first polymer (e.g., which serves as a basis/substrate for grafting of the aromatic moiety to form the polymer-graphene compatibilizer) and the second polymer (e.g., which serves as a matrix for the composite material) can be independently selected thermoplastic polymers, for example those selected from the group consisting of polyolefins, polyamides, proteins, polyesters, polyethers, polyurethanes, polysiloxanes, celluloses, polysulfides, polyacetals, polyethylene oxides, polycaprolactams, polycaprolactones, polylactides, polyimides, polycarbonates, polyether imides, vinyl monomer-based thermoplastics, copolymers thereof, and combinations thereof. Similarly, the first polymer and the second polymer can be independently selected thermoset polymers, for example those selected from the group consisting of epoxy resins, polyurethanes, polyureas, polysiloxanes, phenol-formaldehydes, urea-formaldehydes, melamine-formaldehydes, polyimides, alkyds, rubbers, copolymers thereof, and combinations thereof. In a refinement when the first polymer comprises a thermoset polymer, (i) the thermoset polymer can comprise a reaction product of two or more thermoset precursor components forming the thermoset polymer upon curing; and (ii) the aromatic moiety can be grafted to at least one of the thermoset precursor components.

All patents, patent applications, government publications, government regulations, and literature references cited in this specification are hereby incorporated herein by reference in their entirety. In case of conflict, the present description, including definitions, will control.

Additional features of the disclosure may become apparent to those skilled in the art from a review of the following detailed description, taken in conjunction with the drawings, examples, and appended claims.

BRIEF DESCRIPTION OF THE DRAWINGS

For a more complete understanding of the disclosure, reference should be made to the following detailed description and accompanying drawings wherein.

Figure 1:
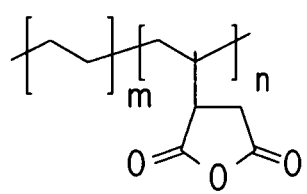
FIG. 1 illustrates the chemical structure of (a) polyethylene-graft-maleic anhydride and (b) 1-pyrenecarbaldehyde.

While the disclosed compositions, apparatus, products, and methods are susceptible of embodiments in various forms, specific embodiments of the disclosure are illustrated in the drawings (and will hereafter be described) with the understanding that the disclosure is intended to be illustrative, and is not intended to limit the claims to the specific embodiments described and illustrated herein.

DETAILED DESCRIPTION

Exfoliated graphene nanoparticle (EGN) platelets have been incorporated into thermoplastic systems with the purpose of enhancing their mechanical, thermal and electrical properties for practical applications. A factor in achieving such desired multifunctional properties is getting the particles to disperse throughout the polymer matrix. However, it is found that the dispersion of EGN platelets in thermoplastics such as polyethylene is usually poor, which results in limited improvement of conductive and mechanical properties. To overcome this limitation, the disclosed compositions improve the chemical attraction between the EGN platelet surfaces and a polymer matrix by the utilization of a chemical pi coupling agent including a chemical group chosen for its compatibility with the basal plane surface of the EGN platelets. Additional functionality of the pi coupling agent can improve the compatibility of the coupling agent with the polymer into which the EGN platelets are dispersed (e.g., by providing a means to graft the coupling agent to the matrix polymer). The application of this pi coupling agent facilitates dispersion to a much greater degree than can be obtained by mechanical mixing or functionalization of the edges of the EGN platelets themselves. As a result, the mechanical strength, thermal and electrical conductivity of a nanocomposite formed with the EGN platelets and a polymer matrix are excellent.

To improve the dispersion of EGN platelets in a thermoplastic system, covalent modification of the EGN platelets themselves has been used. Covalent modification of the EGN platelets relies on the special treatment of the EGN platelets to obtain functional groups anchored on the surface of the platelets. However, the unique and desirable properties of the EGN platelets are due to the planar and defect-free surface of the EGN platelets which is composed of the graphitic basal plane (graphene). Functionalization of this graphene surface will introduce sp3 bonding and defects which deteriorate the desirable properties. Further, the relative amount of edge sites in a platelet morphology is very small compared to the amount of basal plane surface. Therefore, the disclosed compositions, which can attach to the EGN basal pane surface without primary chemical bond formation, make this dispersion process much more effective. The disclosed compositions and methods are based on the absence of covalent modification of the EGN particles and rely on the use of polymers bearing large planar aromatic moieties which are able to interact by $\pi$-$\pi$ (pi-pi) interactions with the graphitic basal plane surface of the EGN platelets. The advantages of the disclosed compositions and methods include not only a substantially improved dispersion of the EGN platelets in the polymer matrix, but also maintenance of the graphene structure and electronic properties of the EGN platelets in their pristine state.

Thus, the disclosure relates to a polymer-graphene compatibilizer including a first polymer and one or more aromatic moieties grafted to the first polymer. The polymer-graphene compatibilizer is capable of coupling with EGN platelets via pi-pi interactions between the aromatic moieties of the compatibilizer and basal planes of the EGN platelets. The disclosure more specifically relates to a composition including the polymer-graphene compatibilizer and EGN platelets dispersed in the compatibilizer, where the compatibilizer and the EGN platelets are coupled via pi-pi interactions (i.e., non-covalent interactions) between the aromatic moieties of the compatibilizer and basal planes of the EGN platelets.

Polymer-Graphene Compatibilizer

The particular polymer used as the basis for the polymer-graphene compatibilizer generally can include any polymer desirable as a matrix polymer for forming a composite with EGN platelets. Compatibility between the polymeric matrix and the EGN platelets is promoted by the grafted aromatic moieties, so the selection of the first polymer for the polymer-graphene compatibilizer is not particularly limited. The first polymer can be a thermoplastic polymer or a thermoset polymer, whether rigid or flexible (e.g., an elastomeric thermoplastic or thermoset). Examples of suitable thermoplastics include polyolefins (e.g., polyethylene, polypropylene), polyamides, proteins, polyesters, polyethers, polyurethanes, polysiloxanes, celluloses, polysulfides, polyacetals, polyethylene oxides, polycaprolactams, polycaprolactones, polylactides, polyimides, polycarbonates, polyether imides, vinyl monomer-based thermoplastics (e.g., poly(vinyl chloride), poly (acrylic, acrylate, methacrylic, or methacrylate) polymers, poly(vinyl alcohol)), copolymers thereof (e.g., block copolymers, random copolymers), and combinations/mixtures (e.g., blends) thereof. Examples of suitable thermosets include epoxy resins, polyurethanes, polyureas, polysiloxanes, phenol-formaldehydes, urea-formaldehydes, melamine-formaldehydes, polyimides, alkyds, rubbers (e.g., natural or synthetic, vulcanized), copolymers thereof, and combinations/mixtures thereof.

As described in more detail below, the aromatic moiety can be directly or indirectly grafted to the first polymer. In the context of a thermoplastic polymer, the aromatic moiety can be grafted to a pre-existing polymeric chain. In the context of a thermoset polymer, the aromatic moiety can be grafted/covalently bonded to either or both of the thermoset precursor components (e.g., a thermoset pre-polymer and/or a thermoset hardener). Once the precursor components are combined and cured to form the thermoset, the aromatic moiety remains grafted to the cured thermoset network and can act as a toughener to improve the adhesion and fracture properties of the final thermoset composite as well as a compatibilizer to improve the dispersion of EGN platelets in the cured thermoset (e.g., which can be pre-mixed with one or both of the precursor components prior to curing or mixed with both precursor components at the time of curing).

The aromatic moieties grafted to the first polymer generally include at least one aromatic ring that is capable of pi bonding with the basal plane of EGN platelets (e.g., non-covalent pi-pi or stacking attractive forces between $sp^2$-bonded carbon atoms in the EGN basal plane and $sp^2$-bonded carbon atoms in the aromatic moieties). More specifically, the aromatic moieties can have between 1 and 20 aromatic rings (e.g., at least 2, 3, 4, 5, or 6 rings and/or up to 6, 8, 10, 12, 16, or 20 rings) that are covalently bonded together. At least some, if not all, of the aromatic rings in an aromatic moiety can be fused together. Suitably, all rings can be fused together to form a single coplanar structure for the aromatic moiety (e.g., the aromatic ring portions of the aromatic moiety). For example, pyrene-derived and methylnaphthalene-derived aromatic moieties have 4- and 2-ring planar fused structures, respectively, notwithstanding substituents to the basic fused ring structures (e.g., substituents that provide the grafting link to the first polymer or that provide a side substituting group such as the methyl group in methylnaphthalene). A planar fused structure of the aromatic moiety facilitates pi bonding with the similar, yet more expansive, structure of the EGN basal plane. In contrast, aromatic moieties based a biphenyl or a polyphenylene structure contain multiple aromatic rings, but the rings are capable of independent rotation and do not necessarily form a planar configuration (although they may adopt a planar configuration, for example when in the neighborhood of an EGN basal plane).

The aromatic rings can include 6-membered aromatic hydrocarbon rings. Suitably, all of the aromatic rings in the aromatic moiety are 6-membered rings to promote compatibility with the structure of the EGN basal plane, although ring structures with other than six atoms can be used (e.g., an azulene-derived aromatic moiety with a 7-membered ring fused to a 5-membered ring). The aromatic rings can be formed exclusively from carbon and hydrogen atoms, although aromatic ring structures with one or more heteroatoms (e.g., N, O, S, P, B) replacing ring carbon atoms can be used. Similarly, the aromatic rings and resulting aromatic moiety can be free from ring-substituting groups other than those used to provide the covalent grafting link to the first polymer. However, substituted ring structures are also possible, for example including pendant ring substituents that are not covalently bonded to the first polymer, such as linear or branched, saturated or unsaturated, substituted or unsubstituted hydrocarbons with or without heteroatoms (e.g., an alkyl or other alkane-based substituent such as a methyl group in an aromatic moiety derived from in 1-methylnaphthalene).

The aromatic moieties can be derived from one or more polynuclear aromatic hydrocarbons, substituted or unsubstituted. Examples of suitable polynuclear aromatic hydrocarbons forming the basis of the aromatic moieties include one or more of acenaphthene, acenaphthylene, anthanthrene, anthracene, azulene, benzene, benzo(a)anthracene, benzo(a)fluorene, benzo(c)phenanthrene, benzopyrene, benzo(a)pyrene, benzo(e)pyrene, benzo(b)fluoranthene, benzo(j)fluoranthene, benzo(k)fluoranthene, benzo(ghi)perylene, corannulune, coronene, chrysene, dibenzo(ah)anthracene, dicoronylene, diindenoperylene, fluoranthene, fluorene, helicene, heptacene, hexacene, indeno(1,2,3-cd)pyrene, kekulene, 1-methylnaphthalene, 2-methylnaphthalene, naphthalene, ovalene, pentacene, perylene, phenalene, phenanthrene, picene, pyrene, tetracene, tetraphenylene, and triphenylene, alkyl-substituted derivatives thereof, and combinations thereof. As used herein, an aromatic moiety that is derived from a polynuclear aromatic hydrocarbon (or any other aromatic ring-containing compound) indicates that the aromatic moiety is based on the structure of the aromatic ring-containing compound less at least one ring hydrogen (or other ring substituent) at the position(s) where the aromatic moiety is covalently bonded to form either the direct or indirect grafting link of the aromatic moiety to the first polymer.

As described below, the aromatic moieties are incorporated into the polymer-graphene compatibilizer at a level generally corresponding to the amount of EGN platelets to be incorporated into an eventual EGN-polymer composite (e.g., based on the surface areas of the EGN platelets and the aromatic moieties). For many intended uses, the aromatic moieties can be incorporated into the polymer-graphene compatibilizer at a level ranging from 0.001 mol. % to 1 mol. % (e.g., 0.01 mol. % to 0.5 mol. %, 0.02 mol. % to 0.2 mol. %) based on the number of aromatic moieties relative to the number of repeating units in the polymer-graphene compatibilizer, or from 0.001 wt. % to 10 wt. % (e.g., 0.01 wt. % to 5 wt. %, 0.1 wt. % to 2 wt. %, 0.5 wt. % to 1 wt. %) based on the weight of aromatic moieties relative to the weight of the polymer-graphene compatibilizer as a whole.

The aromatic moieties are grafted to the first polymer, for example by an intervening covalent linking group between the aromatic moiety and the polymer backbone (e.g., for a thermoplastic first polymer) or the body of the polymer network (e.g., for a thermoset first polymer). The aromatic moiety can be directly grafted to the first polymer, for example resulting from the copolymerization of a vinyl monomer and an aromatic/polynuclear aromatic compound having a vinyl group substituted on the aromatic ring structure. Similarly, the aromatic moiety can be directly grafted to the first polymer in a thermoset polymer network by including an aromatic/polynuclear aromatic compound having a reactive group substituted on the aromatic ring structure with other thermoset precursors during the curing process, where the reactive group is reactive with at least one of the other thermoset precursors (e.g., an aromatic compound with a pendant amino or epoxy group reactive with other epoxy resin precursors). In another embodiment, the aromatic moiety can be grafted to a pre-existing first polymer (or first polymer precursor in a thermoset system, such as an oligomeric prepolymer), for example using a linking group that is reactive with one or more functional groups on the first polymer. The linking group is suitably covalently linked to the aromatic moiety and then reacted with the functional groups of the first polymer (e.g., a di- or multi-functional linking group is first reacted with an aromatic compound including the aromatic moiety, and the linking group-aromatic compound product is then grafted/reacted with first polymer). Examples of suitable reactive/functional groups that can be incorporated into the first polymer, the linking group, and the aromatic compound include amino groups (e.g., primary amines), hydroxy groups (e.g., primary alcohols), carboxylic acid groups, anhydride groups (e.g., an anhydride of a dibasic acid such as maleic anhydride or a residue thereof, such as a maleic anhydride grafted to a repeating unit of the first polymer), aldehyde groups, and alkoxy silanes, among others. The particular types of covalent bonds between the first polymer, the linking group, and the aromatic compound depend on the reactive/functional groups selected (e.g., amides for amino groups reacted with carboxylic acid or anhydride groups, esters for hydroxy groups reacted with carboxylic acid or anhydride groups, imines for amino groups reacted with aldehyde groups).

The linking group between the first polymer and aromatic moiety suitably contains at least 1 (e.g., 1 to 40, 60, 80, or 100) non-hydrogen atoms (e.g., C atoms; heteroatoms such as N, O, S, P, B; Si atoms; and combinations thereof). The effectiveness of the aromatic moiety as a pi coupling agent is increased when the aromatic moiety is free to access the EGN basal plane surface. Thus, the length of the linking group can be selected to be sufficiently long so that the aromatic moiety can rotate/move relatively independently from the first polymer (i.e., via the tethering linking group) and adjust its position freely to increase contact and pi-coupling interactions with neighboring EGN basal plane surfaces. An increasing linking group length increases the ability of the aromatic moiety to interact with and rotate to lie on a neighboring graphene surface. Suitable linking group sizes/lengths that are long enough to promote steric independence between the first polymer and the aromatic moiety yet that are short enough to promote a close proximity between the polymeric and EGN platelet phases can be at least 2, 4, 6, 8 or 10 non-hydrogen atoms and/or up to 20, 25, 30, 35, or 40 non-hydrogen atoms. The size of the linking group can be expressed as the total number of non-hydrogen atoms between the first polymer and aromatic moiety, or it can be expressed as the number of non-hydrogen atoms along the shortest path between the first polymer and aromatic moiety (e.g., when the linking group contains cyclic or branching/side groups with non-hydrogen atoms that do not contribute to increasing the separation between the first polymer and aromatic moiety).

In an embodiment and as a non-limiting example of the foregoing general description, the first polymer of the polymer-graphene compatibilizer includes pendant anhydride groups. For example, the first polymer can be a polyolefin-graft-maleic anhydride polymer such as a polyethylene-graft-maleic anhydride polymer with pendant anhydride groups grafted to the polyolefin/polyethylene backbone. The aromatic moieties of the compatibilizer are grafted to the first polymer via a reaction product of (i) the pendant anhydride group on the first polymer, (ii) a di- or polyaminoalkane forming a linking group between the aromatic moiety and the first polymer, and (iii) an aldehyde-functional aromatic hydrocarbon forming the aromatic moiety. Suitable diaminoalkanes can include linear alkanes with two terminal primary amino groups and at least 2, 4, 6, or 8 carbon atoms and/or up to 10, 15, 20, or 30 carbon atoms (e.g., diaminododecane). Suitable aldehyde-functional aromatic hydrocarbons can include aldehyde-functional polynuclear aromatic hydrocarbons such as any of the above polynuclear aromatic hydrocarbons with a ring substituent replaced with an aldehyde group such as a carbaldehyde (i.e., —CHO) group (e.g., 1-pyrenecarbaldehyde and the corresponding aromatic moiety is a pyrene-derived moiety). The polymer-graphene compatibilizer is capable of coupling with EGN platelets via pi-pi interactions between the aromatic moieties of the compatibilizer and basal planes of the EGN platelets.

Figure 2:
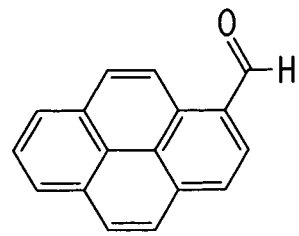
FIG. 2 illustrates the chemical reaction between 1-pyrenecarbaldehyde and diaminododecane to make an amino-functionalized pyrene.
Figure 3:
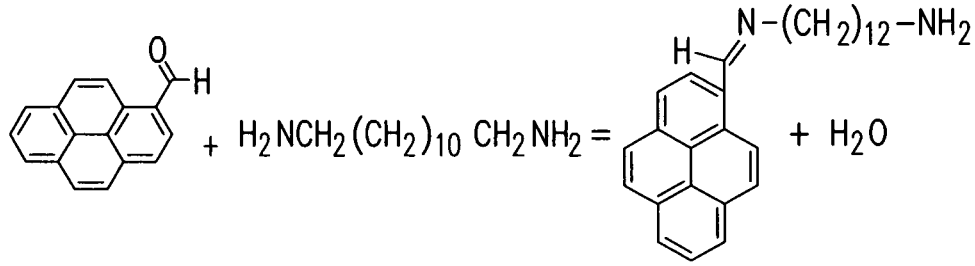
FIG. 3 illustrates the reaction of the amino-functionalized pyrene with the polyethylene-graft-maleic anhydride to form a polyethylene with grafted pendant pyrene aromatic moieties ("PE-g-Py").

The polymer-graphene compatibilizer can be formed in a two-step synthetic process. The aldehyde-functional aromatic hydrocarbon is first reacted with the di- or polyaminoalkane linking group (e.g., in an organic solvent such as ethanol) to form an amino-functionalized aromatic hydrocarbon with an imine linkage (i.e., resulting from the reaction of the aldehyde and the amine) between the aromatic moiety and the linking group, where the linking group in the amino-functionalized aromatic hydrocarbon still retains at least one reactive amino group (e.g., a primary amino group at a terminal end of the linking group opposing the imine linkage, such as illustrated in FIG. 2). It is desirable to use a molar excess of the di- or polyaminoalkane to help ensure that most di- or polyaminoalkanes react with only one aldehyde-functional aromatic hydrocarbon (i.e., to limit the formation of diaminoalkanes that are reacted at both ends with an aldehyde-functional aromatic hydrocarbon and that are unable to further react with/graft to the polymer backbone). The amino-functionalized aromatic hydrocarbon is then reacted with the first polymer (e.g., in an organic solvent, in a heated melt phase of the first polymer, in a liquid phase of a thermoset precursor of the first polymer) to form the polymer-graphene compatibilizer with an amide linkage (i.e., resulting from the reaction of the amine of the amino-functionalized aromatic hydrocarbon and the pendant anhydride group of the first polymer) between first polymer of the amino-functionalized aromatic hydrocarbon (e.g., as illustrated in FIG. 3). It is desirable to form the polymer-graphene compatibilizer in the two-step process to prevent/limit undesirable crosslinking of the first polymer via the di- or polyaminoalkane (i.e., which could result by mixing all three components together or performing the steps in reverse order).

The foregoing synthetic route to forming a polymer-graphene compatibilizer according to the disclosure using a maleic anhydride-functionalized first polymer, a di- or polyaminoalkane, and an aldehyde-functional aromatic hydrocarbon is intended to be illustrative. The selected synthetic route is not particularly limited, as the ability of the compatibilizer to improve the dispersion of EGN platelets in a polymer matrix is substantially a result of the aromatic nature of the aromatic moiety that facilitates pi bonding with the EGN basal plane. Further, the selection of a linking group having a suitable length can promote the relative mobility of the aromatic moiety and its ability to interact with adjacent EGN basal planes, but the particular chemical covalent bonds used to link the linking group to the first polymer and the aromatic moiety are not particularly limited. For example, carboxylic acid functionalities on both the first polymer (e.g., poly(ethylene-co-acrylic acid) and the aromatic compound containing the aromatic moiety (e.g., pyrenecarboxylic acid) could be used to form amide links on opposing ends of a diaminoalkane linking group or to form ester links on opposing ends of an analogous dihydroxyalkane linking group (e.g., 1,12-dodecanediol).

Similarly, the aromatic moiety can be covalently grafted to a first polymer in a thermoset network by any convenient method. For example, a thermoset polymer that is formed using a silane coupling agent of the general form $R_1Si(OR_2)_3$ (e.g., where $OR_2$ represents a hydrolysable alkoxy group such as methoxy or ethoxy) can be selected so that $R_1$ includes a suitable aromatic moiety according to the disclosure, for example including a linking group of suitable length intermediate the aromatic moiety and the silicon atom. For instance, a conventional aminoalkyltrialkoxysilane (e.g., $NH_2—(CH_2)_n—Si(OR_2)_3$, where n has a suitable length for a linking group according to the disclosure) can be reacted with an aldehyde-functional aromatic hydrocarbon to provide a silane coupling agent with an imine-linked aromatic moiety. Similarly, an aldehyde- or epoxy-functional trialkoxysilane can be reacted with an amino-functionalized aromatic hydrocarbon (e.g., derived from an aldehyde-functional aromatic moiety as described above) to provide a silane coupling agent with a linked aromatic moiety. As another illustration, an epoxy resin thermoset polymer based on an epoxide prepolymer and a polyamine hardener as the two thermoset precursors is readily adapted to the inclusion of an aromatic moiety to form a polymer-graphene compatibilizer. For example, the above amino-functionalized aromatic hydrocarbon can be added to the epoxide prepolymer and the polyamine hardener during the curing process, as the terminal amino group of the amino-functionalized aromatic hydrocarbon can react with the epoxide prepolymer and integrate itself into the polymer network. Alternatively or additionally, the aldehyde-functional aromatic hydrocarbon can be reacted directly with and imine-linked to the polyamine hardener directly prior to combination of the aromatic-functionalized polyamine hardener with the epoxide prepolymer (e.g., a pre-curing reaction of the aldehyde-functional aromatic hydrocarbon with triethylenetetramine (TETA) or a more general polyamine such as $(NH_2—[(CH_2)_nNH]_m—(CH_2)—NH_2$, where m and n can range from 1 to 10 and the length of the polyamine is suitable for a linking group according to the disclosure) to form the aromatic-functionalized polyamine hardener).

Exfoliated Graphene Nanoparticle (EGN) Platelets

The graphite material forming the EGN platelets generally can include natural graphite, synthetic graphite, and/or highly oriented pyrolitic graphite. An expanded graphite is one which has been heated to separate individual platelets of graphite. An exfoliated graphite is a form of expanded graphite where the individual platelets are separated by heating with or without an agent (e.g., a polymer or polymer component). The graphite can be heated with conventional (thermal) heating, microwave (MW) energy, or radiofrequency (RF) induction heating. The microwave and radiofrequency methods provide a fast and economical method to produce exfoliated graphite. The combination of microwave or radiofrequency expansion and an appropriate grinding technique (e.g., planetary ball milling, vibratory ball milling), efficiently produces nanoplatelet graphite flakes with a high aspect ratio (e.g., up to 100, 1000, 10,000 or higher), a high surface area (e.g., at least about 50 m$^2$/g, about 75 m$^2$/g, or about 100 m$^2$/g and/or up to about 150 m$^2$/g, about 200 m$^2$/g, and/or about 300 m$^2$/g), and a controlled size distribution. Chemically intercalated graphite flakes are rapidly exfoliated by application of the microwave or radiofrequency energy, because the graphite rapidly absorbs the energy without being limited by convection and conduction heat transfer mechanisms. For example, microwave heating for up to 5 minutes (e.g., and for times as low as about 1 second) exfoliates the graphite and removes/boils the expanding intercalating chemical.

The EGN material suitably has not been oxidized, and thus contains only a minor amount of oxygen in the carbon network (e.g., substantially free from oxygen other than that resulting from natural oxidation processes and/or mechanical size reduction processes). As a result, the EGN platelets have a minor amount of oxygen. Suitably, the EGN platelets contain less than about 10%, 8%, 5%, or 3% oxygen (on a number or weight basis), although residual amounts of oxygen ranging from about 0.1%, about 1%, or about 3% or more are not uncommon at the lower end. Similarly, the EGN platelets can be characterized as containing at least about 90%, 92%, 95%, or 97% carbon (on a number or weight basis). Similarly, the EGN material is desirably in a pristine state that has not undergone intentional covalent modification (e.g., substantially free of defects or added functional groups/atoms other than C and H).

The exfoliated graphite nanoparticle (EGN) material according to the disclosure generally includes a single graphene sheet or multiple graphene sheets stacked and bound together. Each graphene sheet, also referred to as a graphene plane or basal plane, has a two-dimensional hexagonal lattice structure of carbon atoms. Each graphene sheet has a length and a width (or, equivalently, an approximate diameter) parallel to the graphene plane and a thickness (e.g., an average thickness) orthogonal to the graphene plane. Particle diameters generally range from the submicron level to over 100 microns (e.g., about 0.1 μm to about 1 mm; such as about 0.1 μm or 1 μm to about 20 μm, about 2 μm to about 15 μm, about 3 μm to about 10 μm; alternatively or additionally about 5 μm to about 100 μm, about 8 μm to about 80 μm, about 10 μm to about 50 μm). The thickness of a single graphene sheet is about 0.3 nm (e.g., 0.34 nm). Individual EGN particles (or platelets) used herein can include either single graphene sheet or multiple graphene sheets, and thus the thickness of the EGN particles can generally range from or about 0.3 nm to about 20 nm, or about 0.3 nm to about 10 nm (e.g., up to about 2 nm, 4 nm, 6 nm, or 8 nm and/or at least about 0.3 nm, 0.5 nm, 1 nm, or 2 nm). Alternatively, the thickness of the EGN particles can be expressed in term of the number of stacked graphene sheets they contain, for example 1 to 60 or 1 to 30 (e.g., 2 to 50, 3 to 40, or 5 to 30). The EGN platelets preferably have an aspect ratio of at least about 100, for example at least about 1,000 or 2,000 and/or up to about 5,000 or 10,000. The aspect ratio can be defined as the diameter-to-thickness ratio or the width-to-thickness ratio (e.g., with the width being a characteristic (such as average or maximum) dimension in the graphene plane). A population of EGN platelets (or other nanoparticles) can have a distribution of characteristic size parameters (e.g., diameter, thickness, aspect ratio), and the various size ranges can generally apply to the boundaries of the distribution (e.g., upper and lower boundaries such as 1%, 5%, or 10% lower and/or 90%, 95%, or 99% upper cumulative distribution boundaries) and/or the average of the distribution, where the distribution can be based on number, volume, or mass. Suitable EGN particles are available from XG Sciences, Inc. (East Lansing, Mich.) and generally have a thickness of about 5 nm (e.g., average thickness of about 4 nm to 6 nm with a thickness distribution ranging from about 1 nm to about 15 nm).

Additional description related to the present disclosure, which is herein incorporated by reference in its entirety, includes U.S. Patent Application Publication Nos. 2006/0231792 and 2006/0241237 (Drzal et al.) and relates to methods and apparatus for forming expanded graphite nanoparticles using microwaves or radiofrequency waves. Additional disclosure related to exfoliated graphite nanoparticles may be found in U.S. Patent Application Publication Nos. 2004/0127621 and 2008/0206124.

EGN-Polymer Nanocomposites

The disclosed polymer-graphene compatibilizer in any of its various embodiments is capable of coupling with EGN platelets via pi-pi interactions between the aromatic moieties of the compatibilizer and basal planes of the EGN platelets. Such coupling provides for an improved dispersion of the EGN platelets in a polymer matrix (e.g., which can be the polymer-graphene compatibilizer alone or in combination with one or more other matrix polymers) to form an EGN-polymer nanocomposite with improved mechanical, thermal and electrical properties.

The EGN platelets can be dispersed in the polymer-graphene compatibilizer most generally by simply mixing the EGN platelets with the compatibilizer in a liquid medium. The liquid medium can be a melt phase of the polymer-graphene compatibilizer, but suitably is a liquid solvent for the polymer-graphene compatibilizer. The solvent is generally a hydrophobic organic solvent and desirably is an aromatic organic solvent to promote compatibility with the polymer and aromatic moiety portions of the compatibilizer as well as the EGN platelets. Examples of suitable aromatic organic solvent include benzene, naphthalene, alkyl-substituted benzenes such as toluene, one or more xylenes, ethylbenzene, and combinations thereof. A mixture including the solvent and the polymer-graphene compatibilizer may be heated to complete the dissolution of the compatibilizer in the solvent as well as to melt the solvent (e.g., in the case of naphthalene or other solvent that is solid a room temperature).

The EGN platelets are added to the polymer-graphene compatibilizer (e.g., added to the solvent for the compatibilizer, before, during, and/or after any heating thereof) and the two components are then mixed to provide a uniform dispersion of the platelets in the liquid/solvent phase. The mixing can be performed by any conventional means of mixing, for example by ultrasonic mixing, mechanical agitation, mechanical shearing, etc. Ultrasonic mixing is particularly suitable as it can disrupt aggregates of EGN platelets and increase pi-pi interactions between the aromatic moieties of the compatibilizer and basal planes of the EGN platelets.

In the absence of the solvent, the well-mixed dispersion of the EGN platelets in a melt phase of the polymer-graphene compatibilizer can be allowed to cool and form a composite material including a dispersion of the EGN platelets in a solid compatibilizer matrix. In the presence of the solvent, the solvent is then removed (e.g., by evaporation, with or without heating as desired or required based on the nature of the solvent) to form the well-mixed dispersion of the EGN platelets in the polymer-graphene compatibilizer (e.g., a solid matrix of the compatibilizer). In either case, the polymer-graphene compatibilizer and the EGN platelets are coupled via pi-pi interactions between the aromatic moieties of the compatibilizer and basal planes of the EGN platelets (e.g., free or substantially free of any intentional covalent bonding between the platelets and the compatibilizer). Further, the dispersion of the EGN platelets in the compatibilizer can be heated to remove any residual solvent or water present.

The method of forming the dispersion of the EGN platelets in the polymer-graphene compatibilizer can be performed for either thermoplastic or thermoset polymer systems. In a thermoplastic system, the polymer-graphene compatibilizer can represent a fully polymerized polymeric material (e.g., the first polymer with one or more aromatic moieties grafted thereto). In a thermoset system, the aromatic moiety can be grafted to one or more thermoset precursor components (e.g., with a linking group). For example, the aromatic moiety can be grafted to an oligomeric thermoset prepolymer (e.g., with a degree of polymerization of at least 2, 5, or 10 and/or up to 20, 50, or 100) using a linking group as described above. Alternatively, the aromatic moiety can be covalently bonded to another thermoset precursor component (e.g., silane coupling agent, polyamine hardener, or other linking group reactive with one or more other precursor components). In either event, the EGN platelets are suitably mixed/dispersed with the aromatic moiety-containing precursor component (e.g., using ultrasonication or other method, with or without any organic solvent). Once any solvent is removed, the well-mixed dispersion of the EGN platelets and the aromatic moiety-containing precursor component is then combined/mixed with other thermoset precursors (e.g., complementary precursors reactive with the aromatic moiety-containing precursor and/or unmodified analogs of the aromatic moiety-containing precursor) under appropriate curing conditions for the particular thermoset polymer, thus forming a composite thermoset polymer matrix with EGN platelet reinforcements that are coupled via pi-pi interactions between the aromatic moieties and basal planes of the EGN platelets.

The foregoing dispersion of the EGN platelets in the polymer-graphene compatibilizer can be combined with one or more additional polymers as a matrix polymer for a composite material including the polymer-graphene compatibilizer, the EGN platelets, and the additional polymer(s). The additional polymer(s) can include any general thermoplastic or thermoset polymer, for example those described above for the polymer component of the polymer-graphene compatibilizer (e.g., without an aromatic moiety grafted thereto and/or without a functional group such as an anhydride for linking the aromatic moiety to the polymer backbone). The additional polymer(s) can be the same as or different from the first polymer used as the basis of the polymer-graphene compatibilizer. If different, however, the additional polymer(s) is suitably selected to be compatible (e.g., miscible in a melt or other liquid phase) with the first polymer. In any event, the polymer-graphene compatibilizer and the EGN platelets remain coupled via pi-pi interactions between the aromatic moieties of the compatibilizer and basal planes of the EGN platelets, even with the inclusion of the additional polymer(s) to form the composite material.

The additional polymer(s) can be combined with the EGN platelets in the polymer-graphene compatibilizer at any convenient time. For example, the additional polymer(s) can be added to the solvent in the above process along with the platelets and compatibilizer such that, after mixing and solvent removal, the resulting product is the composite material including the polymer-graphene compatibilizer, the EGN platelets, and the additional polymer(s). Suitably, however, the mixing and dispersion of the EGN platelets in the polymer-graphene compatibilizer is performed prior to combination with (e.g., in the absence of) the additional polymer(s). Such a two-step process helps to ensure intimate contact between the aromatic moieties of the compatibilizer and the EGN platelets, thus improving the uniformity of the resulting dispersion. For example, the pre-formed EGN platelet/compatibilizer dispersion can be subsequently combined with the additional polymer(s) (e.g., with each component being in a solid form such as a powder or pellets), and the two components can be melt blended to form the composite material. Any suitable melt blending techniques can be used, for example including extrusion, which can be followed by injection molding to form the composite into a desired shape.

The relative amounts of the EGN platelets and the polymer-graphene compatibilizer in a composition (e.g., in a dispersion of the EGN platelets in the polymer-graphene compatibilizer, with or without an additional matrix polymer, as in an EGN-nanoparticle composite) can be selected based on the relative surface area of (i) the aromatic moieties present in the polymer-graphene compatibilizer or (ii) an equivalent monolayer of polymer-graphene compatibilizer itself compared to the surface area of the EGN platelets present in the composition. More specifically, a ratio of the surface area of the aromatic moieties present in the polymer-graphene compatibilizer in the composition relative to the surface area of the EGN platelets present in the composition can range from 0.01 to 0.2, more specifically 0.02 to 0.1 in some cases (e.g., a surface area ratio of at least 0.001, 0.002, 0.005, 0.01, 0.02, or 0.04 and/or up to 0.08, 0.1, 0.2, 0.5, 1, or 2). Alternatively or additionally, a ratio of the surface area of the polymer-graphene compatibilizer (e.g., expressed as the area of an equivalent monolayer of the compatibilizer as described below) in the composition relative to the surface area of the EGN platelets present in the composition can range from 0.1 to 20, more specifically 1 to 4 or 10 in some cases (e.g., a surface area ratio of at least 0.1, 0.2, 0.5, 0.8, or 1 and/or up 1.2, 1.5, 2, 3, 4, 5, 8, 10, or 20). An increasing surface area ratio is desirable because it results in a higher fraction of the EGN platelet basal plane surface area that is in the vicinity of (i.e., and therefore stabilized by non-covalent pi interactions with) aromatic moieties and the polymer-graphene compatibilizer, which in turn improves the uniformity of the resulting dispersion. A ratio of 1 could theoretically represent (i) complete coverage of the EGN platelet top and bottom exposed basal plane surface areas with aromatic moieties (e.g., assuming that all available aromatic moieties are able to assemble in a continuous layer adjacent the basal plane) or (ii) complete coverage of the EGN platelet top and bottom exposed basal plane surface areas with a monolayer of the compatibilizer polymer molecules, depending on the particular definition of the ratio used. An increase in the ratio above a value of 1 can be desirable to account for a situation in which some aromatic moieties, despite the presence of sufficiently long linking groups, are nonetheless sterically hindered or otherwise unable to rotate/move and come into sufficient proximity/contact with a neighboring basal plane to promote the pi interactions between the two groups. Similarly, compatibilizer polymer molecules may not all assemble as monolayers adjacent to EGN platelet basal plane surfaces, in which case a ratio above 1 can be desirable to promote sufficient compatibilizer-EGN platelet contact. In some cases, ratios substantially above 1 can result in reduced effectiveness of the compatibilizer and/or a resulting composite incorporating the compatibilizer (e.g. as illustrated in the follow example. However, even with a ratio above 1, continuous coverage of the EGN platelet basal plane surface area might not be achieved (e.g., there may be "holes" in a layer of multiple aromatic moieties or compatibilizer polymer molecules neighboring a basal plane), for example due to steric limitations and/or the shape of the aromatic moiety/compatibilizer polymer molecule itself. To this end, it can be desirable to select the aromatic moiety based on its shape and the ability of the shape to be arranged in a continuous layer. Similarly, it can be desirable to incorporate a plurality of different aromatic moiety sizes and/or shapes grafted to the first polymer to facilitate the formation of a continuous aromatic moiety layer neighboring the EGN platelet basal plane. For example, the polymer-graphene compatibilizer described above and illustrated in the example below could be extended to include naphthalene-derived aromatic moieties grafted to the first polymer in addition to the pyrene-derived aromatic moieties grafted to the first polymer. The larger pyrene-derived moieties can account for a majority of the surface area coverage of the EGN platelet basal plane (i.e., due to their larger relative size), while the smaller naphthalene-derived moieties can account for a incremental increase in the surface area coverage of the EGN platelet basal plane (i.e., due to their smaller relative size and ability to fill smaller gaps or holes left by pyrene moieties).

The surface area of the aromatic moiety can be estimated/computed based on the size/shape of the underlying aromatic compound from which the moiety is derived. For example, benzene has an average C—C bond length of about 0.140 nm, so the hexagonal shape defined by the six carbon vertices in the aromatic benzene ring has an area of about 0.051 nm$^2$. The area of larger polynuclear aromatic shapes can be similarly determined (e.g., based on the number of aromatic hexagonal rings in the aromatic moiety); for example, a pyrene moiety has four fused aromatic rings and a surface area of about 0.204 nm$^2$. Regardless of the particular aromatic moiety used, however, the inter-atom bond lengths are generally known or can be determined to estimate the area of the aromatic moiety. Based on the area of an individual aromatic moiety and the level of incorporation (i.e., degree of grafting) of the aromatic moiety into the first polymer, a total surface area contribution of the aromatic moiety from the polymer-graphene compatibilizer can be determined (e.g., a specific surface area expressed as an aromatic moiety surface area per unit mass of the compatibilizer).

The surface area of a monolayer of the polymer-graphene compatibilizer can be estimated/computed based on the radius of gyration for the compatibilizer polymer molecule. The radius of gyration ($r_g$) for a flexible polymer chain can be estimated as $r_g = a(N/6)^{0.5}$, where N is number of bonds along the length of the polymer chain and a is the (average) length of each bond. The compatibilizer polymer molecule can be approximated as having a spherical shape or radius $r_g$, in which case a single compatibilizer polymer molecule has a projected circular area of $\pi r_g^2$. The surface area of the equivalent monolayer of the polymer-graphene compatibilizer is estimated as the sum of the projected circular areas for all of the compatibilizer polymer molecules in a particular composition.

Similar to benzene, graphene has an average C—C bond length of about 0.142 nm. However, as described above, EGN platelets generally include a plurality of stacked graphene sheets, so the EGN platelet basal plane surface area is suitably determined experimentally (i.e., as opposed to being computed/estimated based on geometric principles). For example, as determined by nitrogen gas adsorption measurements and BET surface area analysis, a sample of EGN platelets suitable for use in nanoparticle dispersions and composites according to the disclosure typically has a specific surface area of about 40 m$^2$/g (e.g., at least 1 m$^2$/g, 2 m$^2$/g, 5 m$^2$/g, 10 m$^2$/g, or 20 m$^2$/g and/or up to 50 m$^2$/g, 100 m$^2$/g, or 220 m$^2$/g). For the EGN platelets, the specific surface area values include the combined surface area from the "top" exposed basal plane and the "bottom" exposed basal plane in the plurality of graphene sheets making up each nanoparticle (i.e., where interior basal planes adjacent to other basal planes in the same nanoparticle do not contribute to the surface area value).

The relative amounts of the dispersion/composite components additionally can be expressed in terms of volume or weight fractions or ratios. For example, in a dispersion of the EGN platelets in the compatibilizer but without an additional polymer matrix, (i) the polymer-graphene compatibilizer can be present in an amount ranging from 10 vol. % to 90 vol. % (e.g., 20 vol. % to 60 vol. %, 35 vol. % to 50 vol. %) or from 2 wt. % to 90 wt. % (e.g., 5 wt. % to 75 wt. %, 10 wt. % to 50 wt. %), and (ii) the EGN platelets can be present in an amount ranging from 10 vol. % to 90 vol. % (e.g., 20 vol. % to 60 vol. %, 35 vol. % to 50 vol. %) or from 10 wt. % to 98 wt. % (e.g., 25 wt. % to 95 wt. %, 50 wt. % to 90 wt. %). Similarly, in a composite composition including the EGN platelet/compatibilizer dispersion and an additional polymer matrix, (i) the polymer-graphene compatibilizer can present in an amount ranging from 0.5 vol. % to 25 vol. % (e.g., 1 vol. % to 20 vol. %, 2 vol. % to 15 vol. %, 3 vol. % to 10 vol. %) or from 0.2 wt. % to 30 wt. % (e.g., 0.5 wt. % to 20 wt. %, 1 wt. % to 10 wt. %, 2 wt. % to 5 wt. %), (ii) the EGN platelets can be present in an amount ranging from 0.5 vol. % to 25 vol. % (e.g., 1 vol. % to 20 vol. %, 2 vol. % to 15 vol. %, 3 vol. % to 10 vol. %) or from 0.5 wt. % to 50 wt. % (e.g., 1 wt. % to 40 wt. %, 2 wt. % to 20 wt. %, 5 wt. % to 15 wt. %), and (iii) the additional matrix polymer(s) can be present in an amount ranging from 50 vol. % to 99 vol. % (e.g., 65 vol. % to 98 vol. %, 80 vol. % to 95 vol. %) or from 50 wt. % to 99 wt. % (e.g., 65 wt. % to 95 wt. %, 80 wt. % to 90 wt. %). Alternatively or additionally, the ratio of the weight of the polymer-graphene compatibilizer to the weight of the EGN platelets in a composition can range from 0.1 to 1 (e.g., at least 0.02, 0.05, 0.1, or 0.2 and/or up to 0.5, 1, 2, 5) regardless of the presence or absence of other components in the composition.

EXAMPLE

The following example illustrates an embodiment of the disclosed compositions and methods, but is not intended to limit the scope of any claims thereto.

Materials:

The starting materials for the synthesis of polyethylene grafted with pyrene functionality are polyethylene-graft-maleic anhydride (PE-g-MA, 0.5 wt % MA content (equivalently about 0.14 mol. % MA content), Sigma-Aldrich), 1-pyrenecarbaldehyde (Sigma-Aldrich) and diaminododecane (Sigma-Aldrich). The chemical structure of PE-g-MA and 1-pyrenecarbaldehyde is shown in the FIG. 1. HDPE pellets with the trade name MARLEX HXM 50100 (Density 0.948 g/cm$^3$. ASTM D1505; Flow index 10.0 g/10 min, ASTM D1238) were obtained from Chevron Phillips Chemical Company. EGN platelets with an average diameter of about 15 μm ("EGN-15") were prepared with acid-intercalated natural crystalline graphite followed by rapid exfoliation in a microwave environment using procedures and processes disclosed in Drzal et al. U.S. Publication Nos. 2006/0231792 and 2006/0241237. The EGN platelets had a density of about 2.1 g/cm$^3$ and a specific surface area of about 40 m$^2$/g.

Preparation of Amino-Functionalized Pyrene (Py-NH$_2$):

Amino-functionalized pyrene (Py-NH$_2$) was synthesized through the reaction between 1-pyrenecarbaldehyde with 5 eq of diaminododecane in ethanol at room temperature for 18 hours. The precipitate formed after reaction was then filtered, washed by ethanol thoroughly and dried under vacuum. The reaction equation is presented in the FIG. 2.

Preparation of Polyethylene-Graft-Pyrene (PE-g-Py):

Polyethylene-graft-pyrene (PE-g-Py) was synthesized through the reaction of Py-NH, and PE-g-MA. PE-g-MA was first melted in a 100 ml beaker at around 120° C., 2 eq of Py-NH, (compared to maleic anhydride functions) was then add to ensure the fully conversion of MA groups. The reaction time was controlled as 10 mins and mechanical stirring was also applied. The resulting polymer mixture was dissolved in xylene at around 120° C. and precipitated in copious methanol in order to remove the excess of the amine bearing molecules. The equation of this reaction is shown in the FIG. 3. The resulting PE-g-Py polymer had a molecular weight ($M_w$) of about 10,700 and a density of about 0.96 g/cm$^3$.

Figure 4:
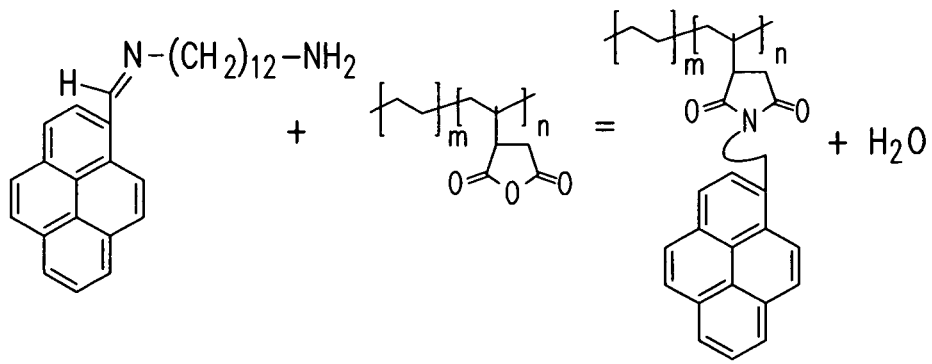
FIG. 4 illustrates a process for establishing π-π stacking between EGN platelets and a functionalized polymer-graphene compatibilizer according to the disclosure (e.g., EGN platelets dispersed in polyethylene-graft-pyrene).

Dispersion of EGN-15 in PE-g-Py to Establish the π-π Stacking:

EGN-15 platelets were dispersed within PE-g-Py by a solution compounding method 10 in order to prepare master batches to be re-dispersed in HDPE. This procedure is schematically shown in the FIG. 4. The PE-g-Py compatibilizer 22 was dissolved in a xylene solvent 24 at 120° C. in a mixing vessel 20 and the selected amount of EGN-15 platelets 26 was then added to form a mixture 28 of the three components. Ultrasonication at 100 W was applied for 30 mins to the mixture to break down the EGN-15 aggregates and ensure the π-π interaction between EGN-15 and PE-g-Py. The resultant well dispersed, disaggregated mixture 28' was poured into an aluminum pan 30 and left in a hood at room temperature for the solvent evaporation. After the xylene is completely evaporated, the PE-g-Py/EGN-15 composition 32 was further dried in a vacuum oven overnight at 80° C. Then PE-g-Py/EGN-15 was re-dispersed in HDPE matrix by melt-mixing in a DSM Micro 15 cc Compounder at 220° C. for 5 mins. After extrusion, the resultant HDPE/PE-g-Py/EGN-15 polymer melts were injection molded into standard coupons for mechanical testing and other property tests.

Figure 5:
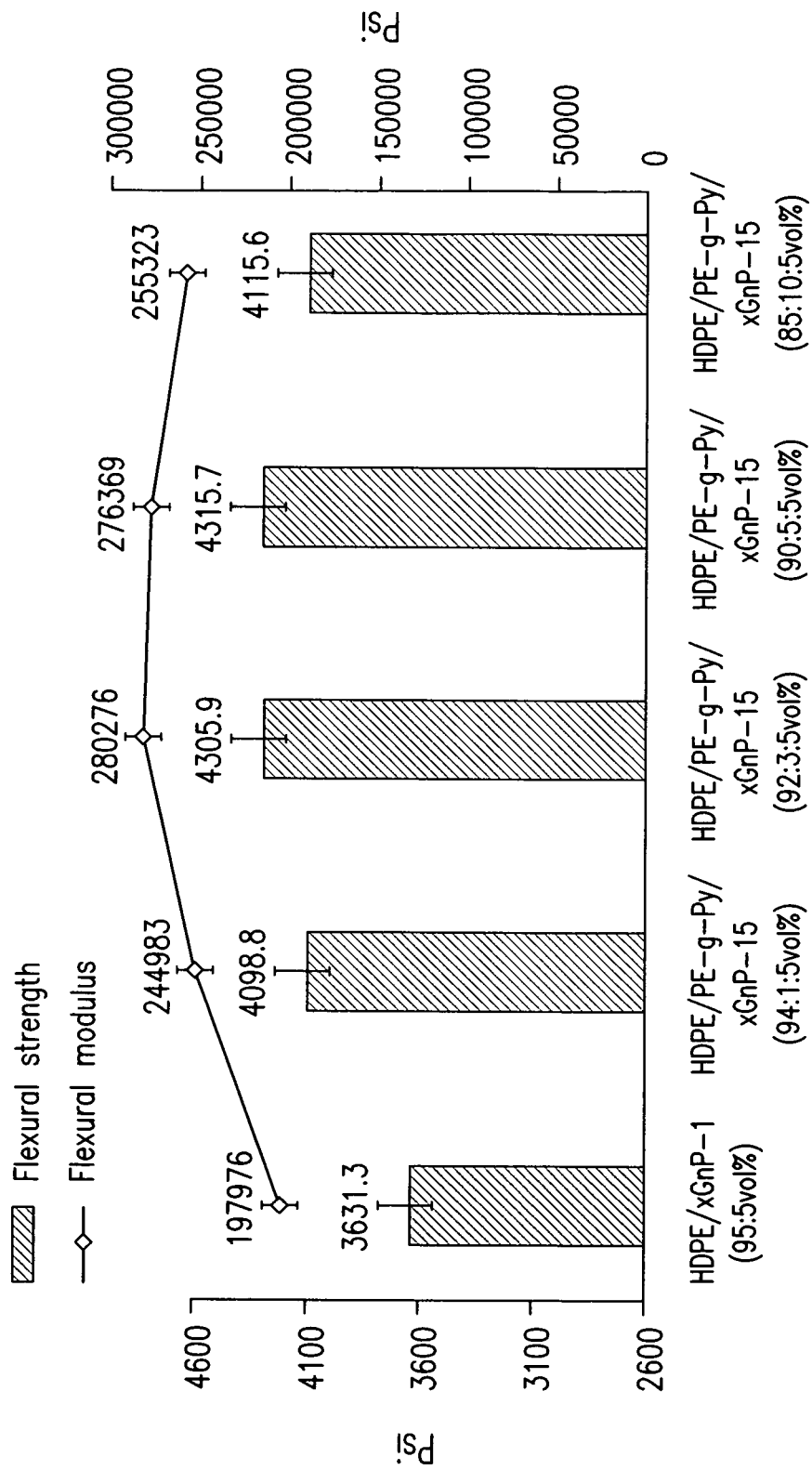
FIG. 5 illustrates the flexural properties of HDPE/PE-g-Py/EGN (15 µm) nanocomposites formed according to the disclosure (a: 95/0/5, b: 94/1/5, c: 92/3/5, d: 90/5/5, e: 85/10/5 all vol. % of HDPE/PE-g-Py/EGN).

Mechanical Properties:

FIG. 5 presents the flexural properties of HDPE/PE-g-Py/EGN-15 nanocomposites at 5 vol % EGN-15 loading and their comparison with the control sample (HDPE/EGN-15 at 5 vol % EGN-15 loading). The PE-g-Py content varies in different HDPE/PE-g-Py/EGN-15 nanocomposites but the loading of EGN-15 is kept the same. As seen from this figure, all the HDPE/PE-g-Py/EGN-15 nanocomposites exhibit better flexural strength and flexural modulus than the control sample. There exists an optimum PE-g-Py concentration in HDPE/PE-g-Py/EGN-15 system which results in the best flexural properties. The optimum PE-g-Py content occurs at about 3-5 vol %, and the highest flexural strength and flexural modulus of HDPE/PE-g-Py/EGN-15 nanocomposites are increased by 19% and 42% respectively compared with the control sample. The substantial enhancement in flexural modulus clearly indicates the better dispersion of EGN-15 in HDPE matrix through the π-π interaction between EGN-15 and PE-g-Py.

Figure 6:
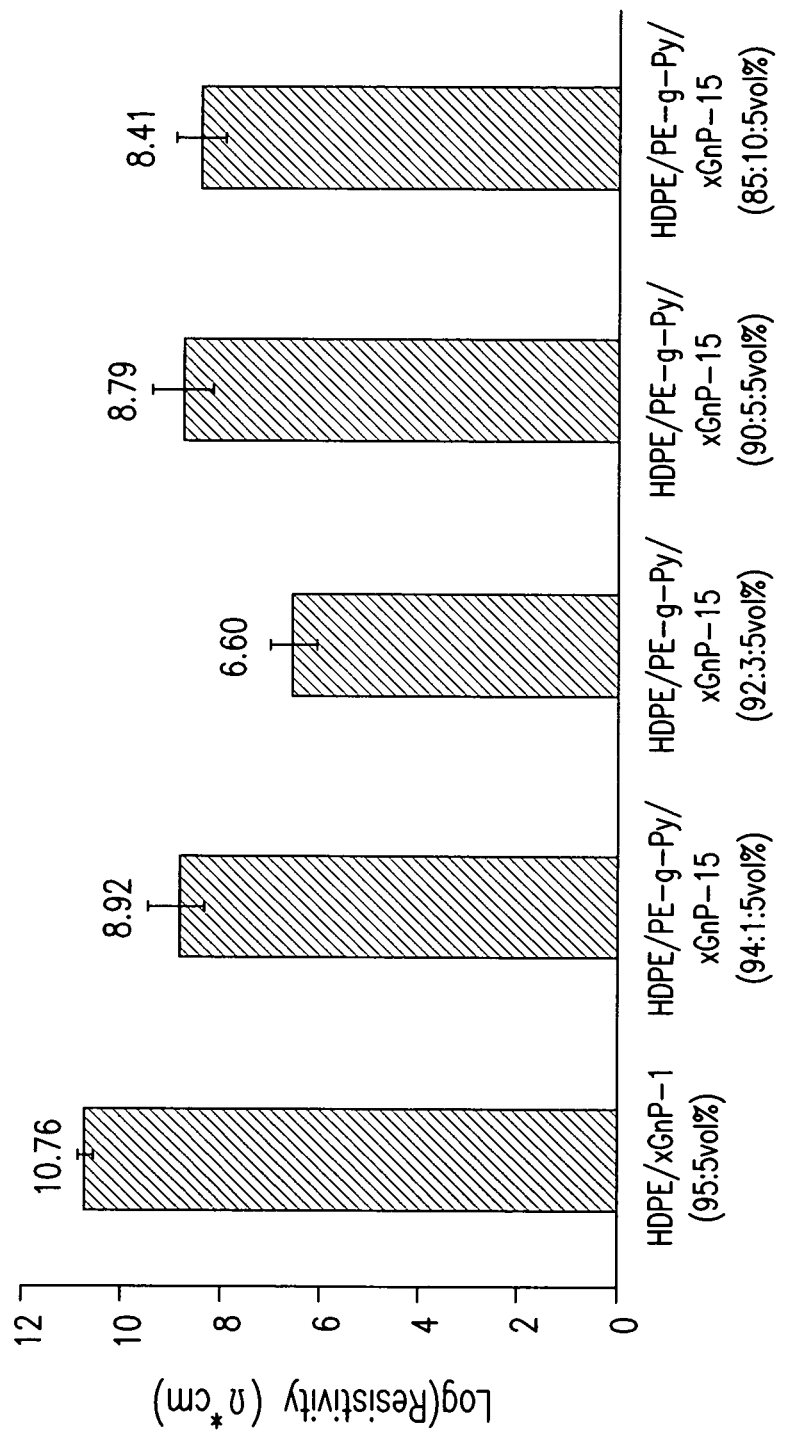
FIG. 6 illustrates the in-plane electrical resistivity of HDPE/PE-g-Py/EGN (15 µm) nanocomposites formed according to the disclosure (a: 95/0/5, b: 94/1/5, c: 92/3/5, d: 90/5/5, e: 85/10/5 all vol. % of HDPE/PE-g-Py/EGN).

Electrical Properties:

The in-plane electrical resistivity of HDPE/PE-g-Py/EGN-15 nanocomposites is displayed in the FIG. 6. It is concluded that the electrical resistivity of HDPE/PE-g-Py/EGN-15 nanocomposites is significantly reduced which means that the electrical conductivity of HDPE/EGN-15 nanocomposites are dramatically improved by using PE-g-Py as a dispersing agent. The lowest electrical resistivity or best electrical conductivity occurs at HDPE/PE-g-Py/EGN-15 (92:3:5 vol %) sample, of which the resistivity value drops by more than 4 orders of magnitude compared with the control sample. The enhanced electrical conductivity results from the better EGN-15 dispersion in HDPE matrix and the elimination of EGN-15 aggregates which lead to a better level of percolation at a lower concentration to increase the connections between EGN-15 platelets.

Figure 7:
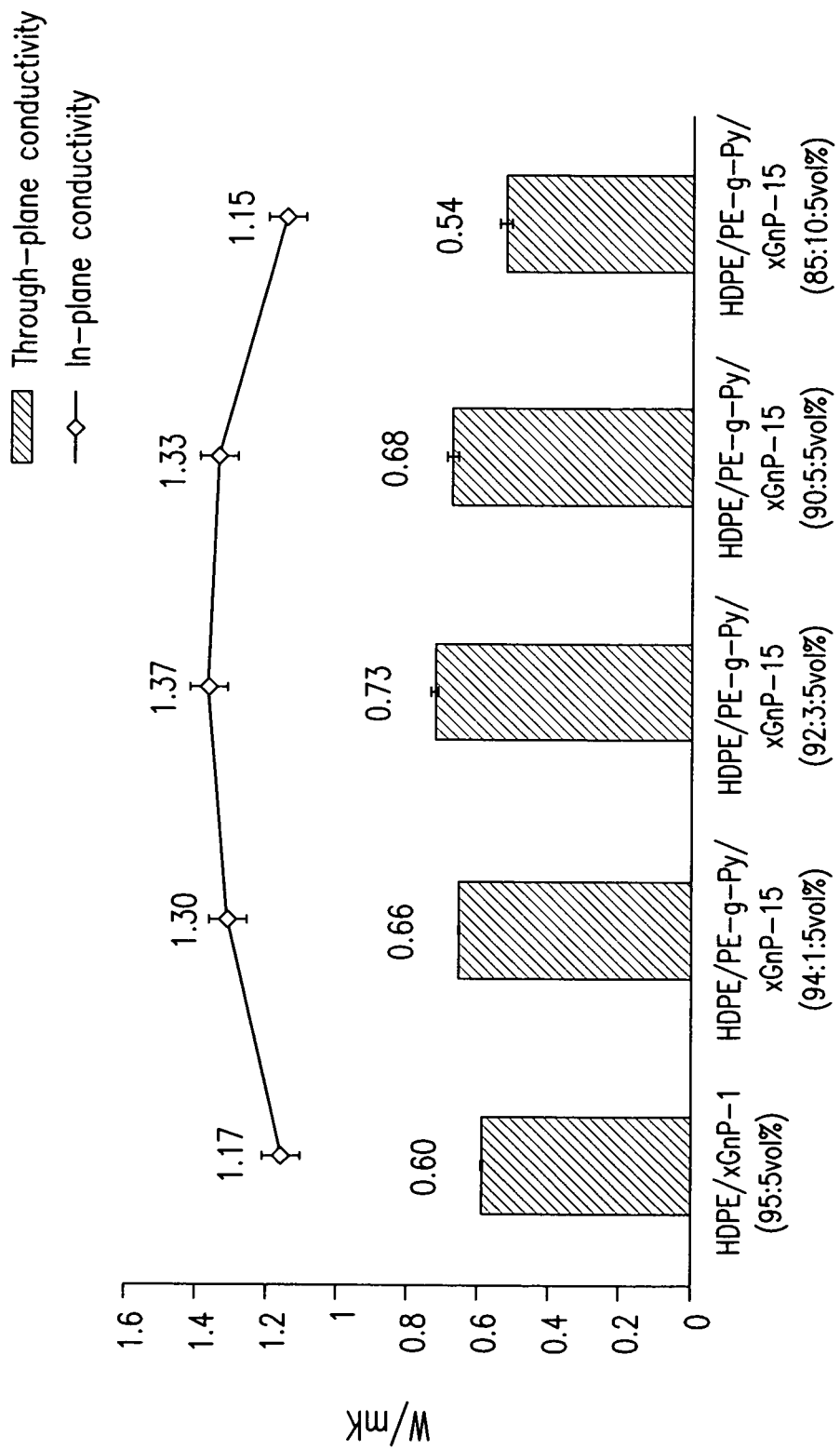
FIG. 7 illustrates the thermal conductivity of HDPE/PE-g-Py/EGN (15 µm) nanocomposites formed according to the disclosure (a: 95/0/5, b: 94/1/5, c: 92/3/5, d: 90/5/5, e: 85/10/5 all vol. % of HDPE/PE-g-Py/EGN).

Thermal Properties:

FIG. 7 shows the in-plane and through-plane thermal conductivity of HDPE/PE-g-Py/EGN-15 nanocomposites. Based on this figure, there also exists an optimum PE-g-Py content that results in highest improvement both for in-plane and through-plane thermal conductivity. The best thermal conductivity belongs to the HDPE/PE-g-Py/EGN-15 (92:3:5 vol %) sample and the in-plane and through-plane thermal conductivity is increased by 18% and 22% respectively compared with the conductivity values of the control sample.

Surface Areas:

The tested compositions can be characterized in terms of the relative surface area coverage between the compatibilizer and EGN platelets. Table 1 summarizes the relative surface area values of composite compositions (a)-(e) above in terms of both volume and weight fractions. In Table 1, the value $R_1$ represents the ratio of the specific surface area of pyrene aromatic moieties in the compatibilizer relative to the specific surface area of the EGN platelets, and the value $R_2$ represents the ratio of the specific surface area of a compatibilizer monolayer relative to the specific surface area of the EGN platelets. Based on the level of incorporation of pyrene moieties in the PE-g-Py compatibilizer (about 1 wt. %, which corresponds to the original maleic anhydride content of 0.5 wt. % in PE-g-MA), the specific surface area of pyrene aromatic moieties in the PE-g-Py compatibilizer is estimated to be about 6.14 m$^2$ of aromatic moieties/g of compatibilizer. Based on the structure and molecular weight of the PE-g-Py compatibilizer ($M_w$ of about 10,700), the specific surface area of the compatibilizer monolayer relative to the specific surface area of the EGN platelets is estimated to be about 439 m$^2$ of compatibilizer monolayer/g of compatibilizer. As noted above, the EGN platelets had a measured specific surface area of about 40 ml exposed basal planes/g EGN platelets.

TABLE 1

Relative Surface Area Coverage of Composite Compositions

| Comp[1] | Hd[2] vol | PE-g[3] vol % | E[4] vol % | HD[5] wt % | PE-g[6] wt % | E[7] wt % | Area Ratio[8] E |
|---|---|---|---|---|---|---|---|
| a | 9 | 0 |  | 89 | 0.0 | 1 | 0.0 | 0 |
| b | 9 | 1 |  | 88 | 0.9 | 1 | 0.0 | 1 |
| c | 9 | 2 |  | 86 | 2.8 | 1 | 0.0 | 3 |
| e | 9 | 5 |  | 84 | 4.7 | 1 | 0.0 | 5 |
| e | 8 | 10 |  | 80 | 9.5 | 1 | 0.0 | 1 |

Supra:
[1]Composition
[2]High Density Polyethylene - volume percent
[3]Polyethylene grafted Pyrene - volume percent
[4]Exfoliated Graphene Nanoparticle - volume percent
[5]High Density Polyethylene - weight percent
[6]Polyethylene grafted Pyrene - weight percent
[7]Exfoliated Graphene Nanoparticle - weight percent
[8]Area Ratios Summary: Based on the mechanical, electrical and thermal properties test, PE-g-Py is shown as an efficient dispersion agent for EGN-15 platelets in HDPE matrix which results in substantially enhanced mechanical property and electrical and thermal conductivity of HDPE nanocomposites.

Because other modifications and changes varied to fit particular operating requirements and environments will be apparent to those skilled in the art, the disclosure re is not considered limited to the examples chosen for purposes of illustration, and covers all changes and modifications which do not constitute departures from the true spirit and scope of this disclosure.

Accordingly, the foregoing description is given for clarity of understanding only, and no unnecessary limitations should be understood therefrom, as modifications within the scope of the disclosure may be apparent to those having ordinary skill in the art.

Throughout the specification, where the compositions, processes, or apparatus are described as including components, steps, or materials, it is contemplated that the compositions, processes, or apparatus can also comprise, consist essentially of, or consist of, any combination of the recited components or materials, unless described otherwise. Component concentrations expressed as a percent are weight-percent (% w/w), unless otherwise noted. Other volumetric concentrations or surface densities without u nits are expressed as a number concentration/density unless otherwise noted. Numerical values and ranges can represent the value/range as stated or an approximate value/range (e.g., with or without the term "about"). Combinations of components are contemplated to include homogeneous and/or heterogeneous mixtures, as would be understood by a person of ordinary skill in the art in view of the foregoing disclosure.

What is claimed is:

1. A composition of matter comprising:
   (a) a first polymer;
   (b) a polymer-graphene compatibilizer comprising (i) said first polymer and (ii) one or more aromatic moieties grafted to said first polymer;
   (c) exfoliated graphene nanoparticle platelets dispersed in said polymer-graphene compatibilizer;
   (d) wherein said polymer-graphene compatibilizer and said platelets are coupled via pi-pi interactions between said aromatic moieties of said compatibilizer and said basal planes of said platelets;
   (e) wherein the first polymer is selected from the group consisting of polyolefins, polyamides, proteins, polyesters, polyethers, polyurethanes, polysiloxanes, celluloses, polysulfides, polyacetals, polyethylene oxides, polycaprolactams, polycaprolactones, polylactides, polyimides, polycarbonates, polyether imides, vinyl monomer-based thermoplastics, epoxy resins, polyureas, phenol-formaldehyde, urea-formaldehydes, melamine-formaldehydes, polyimides, alkyds, rubbers, copolymers thereof, and combinations thereof.

2. The composition of claim 1, wherein the aromatic moieties are directly grafted to the first polymer.

3. The composition of claim 1, wherein the aromatic moieties are grafted to the first polymer via a linking group containing 1 to 40 non-hydrogen atoms between the first polymer and the aromatic moieties.

4. The composition of claim 3, wherein the aromatic moieties are grafted to the first polymer via a reaction product of (i) a pendant anhydride group on the first polymer, (ii) a diaminoalkane forming the linking group, and (iii) an aldehyde-functional aromatic hydrocarbon forming the aromatic moiety.

5. The composition of claim 4, wherein:
   (i) the first polymer comprises a polyethylene-graft-maleic anhydride polymer with pendant anhydride groups grafted to the polyethylene backbone;
   (ii) the linking group comprises diaminododecane; and
   (iii) the aldehyde-functional aromatic hydrocarbon comprises 1-pyrenecarbaldehyde.

6. The composition of claim 1, wherein the aromatic moieties have between 1 and 20 aromatic rings.

7. The composition of claim 1, wherein the aromatic moieties have between 2 and 10 fused aromatic rings.

8. The composition of claim 1, wherein the aromatic moieties are derived from one or more polynuclear aromatic hydrocarbons.

9. The composition of claim 1, wherein the aromatic moieties are derived from one or more of acenaphthene, acenaphthylene, anthanthrene, anthracene, azulene, benzene, benzo(a)anthracene, benzo(a)fluorene, benzo(c)phenanthrene, benzopyrene, benzo(a)pyrene, benzo(e)pyrene, benzo(b)fluoranthene, benzo(j)fluoranthene, benzo(k)fluoranthene, benzo(ghi)perylene, corannulue, coronene, chrysene, dibenzo(ah)anthracene, dicoronylene, diindenoperylene, fluoranthene, fluorene, helicene, heptacene, hexacene, indeno(1,2,3-cd)pyrene, kekulene, 1-methylnaphthalene, 2-methylnaphthalene, naphthalene, ovalene, pentacene, perylene, phenalene, phenanthrene, picene, pyrene, tetracene, tetraphenylene, and triphenylene, alkyl-substituted derivatives thereof, and combinations thereof.

10. The composition of claim 1, wherein the coupling between the polymer-graphene compatibilizer and the EGN platelets is free of covalent bonds.

11. The composition of claim 1, wherein the aromatic moieties are incorporated into the polymer-graphene compatibilizer at a level ranging from 0.001 mol. % to 1 mol. % based on the number of aromatic moieties relative to the number of repeating units in the polymer-graphene compatibilizer.

12. The composition of claim 1, wherein the EGN platelets have a thickness ranging from 0.3 nm to 20 nm and a width ranging from 0.1 μm to 20 μm.

13. The composition of claim 1, wherein the first polymer comprises a thermoplastic polymer.

14. The composition of claim 1, wherein the first polymer comprises a thermoset polymer.

15. The composition of claim 14, wherein:
(i) the thermoset polymer comprises a reaction product of two or more thermoset precursor components forming the thermoset polymer upon curing; and
(ii) the aromatic moiety is grafted to at least one of the thermoset precursor components.

16. The composition of claim 1, wherein a ratio of the surface area of the aromatic moieties present in the polymer-graphene compatibilizer in the composition relative to the surface area of the EGN platelets present in the composition ranges from 0.01 to 0.2.

17. The composition of claim 1, wherein a ratio of the surface area of a monolayer equivalent of the polymer-graphene compatibilizer in the composition relative to the surface area of the EGN platelets present in the composition ranges from 0.1 to 20.

18. The composition of claim 1, wherein the second polymer comprises a thermoplastic polymer.

19. The composition of claim 1, wherein the second polymer comprises a thermoset polymer.

20. The composition of claim 1, wherein a ratio of the surface area of the aromatic moieties present in the polymer-graphene compatibilizer in the composition relative to the surface area of the EGN platelets present in the composition ranges from 0.02 to 0.1.

21. The composition of claim 1, wherein a ratio of the surface area of a monolayer equivalent of the polymer-graphene compatibilizer in the composition relative to the surface area of the EGN platelets present in the composition ranges from 1 to 4.

22. The composition of claim 1, wherein the first polymer and the second polymer are the same.

23. The composition of claim 2, wherein the first polymer and the second polymer are different but compatible with each other.

24. A polymer-graphene compatibilizer of claim 1, comprising:
(a) a first polymer; and
(b) one or more aromatic moieties grafted to the first polymer;
wherein:
(i) the aromatic moieties are grafted to the first polymer via a reaction product of (A) a pendant anhydride group on the first polymer, (B) a diaminoalkane forming a linking group between the aromatic moiety and the first polymer, and (C) an aldehyde-functional aromatic hydrocarbon forming the aromatic moiety; and
(ii) the polymer-graphene compatibilizer is capable of coupling with exfoliated graphite nanoparticle (EGN) platelets via pi-pi interactions between the aromatic moieties of the compatibilizer and basal planes of the EGN platelets.

25. A method for forming a dispersion of exfoliated graphite nanoparticle (EGN) platelets in a polymer-graphene compatibilizer of claim 1, the method comprising:
(a) providing a composition comprising (i) a polymer-graphene compatibilizer comprising (A) a first polymer and (B) one or more aromatic moieties grafted to the first polymer, (ii) a solvent for the polymer-graphene compatibilizer, and (iii) exfoliated graphite nanoparticle (EGN) platelets;
(b) mixing the composition, thereby providing the polymer-graphene compatibilizer in solution with the solvent and dispersing the EGN platelets in the solvent; and
(c) removing the solvent from the composition, thereby forming a dispersion of the EGN platelets in the polymer-graphene compatibilizer in which the polymer-graphene compatibilizer and the EGN platelets are coupled via pi-pi interactions between the aromatic moieties of the compatibilizer and basal planes of the EGN platelets.

26. A method for forming a dispersion of exfoliated graphite nanoparticle (EGN) platelets in a polymer-graphene compatibilizer of claim 1, the method comprising:
(a) providing a composition comprising (i) a polymer-graphene compatibilizer precursor comprising (A) a first thermoset polymer precursor and (B) one or more aromatic moieties grafted to the first thermoset polymer precursor, (ii) a solvent for the polymer-graphene compatibilizer precursor, and (iii) exfoliated graphite nanoparticle (EGN) platelets;
(b) mixing the composition, thereby providing the polymer-graphene compatibilizer precursor in solution with the solvent and dispersing the EGN platelets in the solvent;
(c) removing the solvent from the composition, thereby forming a dispersion of the EGN platelets in the polymer-graphene compatibilizer precursor in which the polymer-graphene compatibilizer precursor and the EGN platelets are coupled via pi-pi interactions between the aromatic moieties of the compatibilizer precursor and basal planes of the EGN platelets;
(d) adding a second thermoset polymer precursor to the dispersion of the EGN platelets in the polymer-graphene compatibilizer precursor, wherein the second thermoset polymer precursor is a complementary thermoset precursor reactive with polymer-graphene compatibilizer precursor; and
(e) curing the second thermoset polymer and the polymer-graphene compatibilizer precursor with the EGN platelets dispersed therein, thereby forming dispersion of the EGN platelets in a thermoset polymer-graphene compatibilizer, wherein the thermoset polymer-graphene compatibilizer and the EGN platelets are coupled via pi-pi interactions between the aromatic moieties of the compatibilizer and basal planes of the EGN platelets.

27. The method of claim 25 wherein the solvent comprises a hydrophobic organic solvent.

28. The method of claim 26, wherein the solvent comprises a hydrophobic organic solvent.

29. The method of 27, wherein the hydrophobic organic solvent comprises an aromatic solvent.

30. The method of claim 25 wherein mixing the composition comprises:
(i) heating the composition to dissolve the polymer-graphene compatibilizer in the solvent; and
(ii) performing ultrasonic mixing to disrupt aggregates of EGN platelets and increase pi-pi interactions between the aromatic moieties of the compatibilizer and basal planes of the EGN platelets.

31. The method of claim 26 wherein mixing the composition comprises:
(i) heating the composition to dissolve the polymer-graphene compatibilizer in the solvent; and
(ii) performing ultrasonic mixing to disrupt aggregates of EGN platelets and increase pi-pi interactions between the aromatic moieties of the compatibilizer and basal planes of the EGN platelets.

32. The method of claim 25 wherein removing the solvent from the composition comprises:
(i) evaporating the solvent; and
(ii) heating the dispersion of the EGN platelets in the polymer-graphene compatibilizer to remove residual solvent or water.

33. The method of claim 26 wherein removing the solvent from the composition comprises:
(i) evaporating the solvent; and
(ii) heating the dispersion of the EGN platelets in the polymer-graphene compatibilizer to remove residual solvent or water.

34. A method for forming a polymer-graphene compatibilizer of claim 1, the method comprising:
(a) reacting (i) an aldehyde-functional aromatic hydrocarbon, (ii) a polyaminoalkane, and (iii) a first polymer comprising one or more pendant anhydride groups, thereby forming the polymer-graphene compatibilizer with one or more aromatic moieties grafted to the first polymer;
wherein:
(i) the aromatic moiety is derived from the aldehyde-functional aromatic hydrocarbon; and
(ii) the polyaminoalkane forms (A) an imine linkage to the aromatic moiety and (B) an amide linkage to the first polymer.

35. The method of claim 34 wherein the reacting part (a) comprises:
(i) providing the aldehyde-functional aromatic hydrocarbon;
(ii) reacting the aldehyde-functional aromatic hydrocarbon with the polyaminoalkane, thereby forming an amino-functionalized aromatic hydrocarbon with the imine linkage; and
(iii) reacting the amino-functionalized aromatic hydrocarbon with the first polymer, thereby forming the polymer-graphene compatibilizer with the amide linkage to the first polymer of the amino-functionalized aromatic hydrocarbon.

36. The method of claim 34, wherein:
(i) the first polymer comprises a polyethylene-graft-maleic anhydride polymer with pendant anhydride groups grafted to the polyethylene backbone;
(ii) the linking group comprises diaminododecane; and
(iii) the aldehyde-functional aromatic hydrocarbon comprises 1-pyrenecarbaldehyde.

37. A method for forming a composite material, the method comprising:
(a) providing the composition according to any of claims 2 to 16; and 1
(b) providing a second polymer as a matrix polymer;
(c) melt blending the composition and the second polymer, thereby forming a composite material comprising the polymer-graphene compatibilizer, the EGN platelets, and the second polymer;
wherein:
(i) the second polymer can be the same as or different from the first polymer of the polymer-graphene compatibilizer; and
(ii) the polymer-graphene compatibilizer and the EGN platelets are coupled via pi-pi interactions between the aromatic moieties of the compatibilizer and basal planes of the EGN platelets.

38. The method of claim 37, wherein melt blending in part (c) comprises extruding a blend of the composition and the second polymer and optionally comprises injection molding the extruded blend into a desired shape.

* * * * *

UNITED STATES PATENT AND TRADEMARK OFFICE
CERTIFICATE OF CORRECTION

PATENT NO. : 9,776,874 B1  
APPLICATION NO. : 13/199086  
DATED : October 3, 2017  
INVENTOR(S) : Lawrence T. Drzal and Xian Jiang Page 1 of 1

It is certified that error appears in the above-identified patent and that said Letters Patent is hereby corrected as shown below:

On the Title Page

Please add:
"Assignee: Michigan State University, East Lansing, MI (US)"

Signed and Sealed this
Eighteenth Day of December, 2018

Andrei Iancu
*Director of the United States Patent and Trademark Office*